US012220906B2

(12) United States Patent
Okumura et al.

(10) Patent No.: US 12,220,906 B2
(45) Date of Patent: Feb. 11, 2025

(54) IMAGE RECORDING APPARATUS

(71) Applicant: BROTHER KOGYO KABUSHIKI KAISHA, Nagoya (JP)

(72) Inventors: Masayuki Okumura, Nagoya (JP); Shigeki Kato, Toyoake (JP); Yoshiya Tomatsu, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 115 days.

(21) Appl. No.: 17/809,134

(22) Filed: Jun. 27, 2022

(65) Prior Publication Data

US 2022/0410595 A1 Dec. 29, 2022

(30) Foreign Application Priority Data

Jun. 29, 2021 (JP) ................................ 2021-108036

(51) Int. Cl.
*B41J 11/00* (2006.01)
*B41J 3/407* (2006.01)
*B41J 11/06* (2006.01)
*B41J 15/04* (2006.01)

(52) U.S. Cl.
CPC ......... *B41J 11/0055* (2013.01); *B41J 3/4075* (2013.01); *B41J 11/007* (2013.01); *B41J 11/0085* (2013.01); *B41J 11/06* (2013.01); *B41J 15/048* (2013.01)

(58) Field of Classification Search
CPC .. B41J 11/0085; B41J 3/4075; B41J 11/0055; B41J 11/06; B41J 15/048; B41J 11/007
See application file for complete search history.

(56) References Cited

U.S. PATENT DOCUMENTS

2007/0126832 A1* 6/2007 Kito ......................... B41J 11/06 347/101
2021/0179375 A1 6/2021 Okumura et al.

FOREIGN PATENT DOCUMENTS

JP H06278923 A 10/1994
JP 2003118902 A 4/2003
JP 2013060265 A 4/2013
(Continued)

OTHER PUBLICATIONS

Notice of Reasons for Refusal dated Dec. 24, 2024 received from the Japanese Patent Office, 5 pages.

*Primary Examiner* — Geoffrey S Mruk
(74) *Attorney, Agent, or Firm* — Scully, Scott, Murphy & Presser, P.C.

(57) ABSTRACT

A printer includes: a conveyor conveying a sheet in a conveying direction; a first supporting part positioned on an upstream side in the conveying direction with respect to the conveyor, and having a first supporting surface; a side guide making contact with at least one of both ends, in a width direction of the sheet, in the first supporting surface, the width direction being orthogonal to the conveying direction and parallel to the first supporting surface; a suction-attraction force generator generating a suction-attraction force in an area, in the first supporting surface, which is adjacent to the side guide and in which the sheet passes; a second supporting part positioned on a downstream side in the conveying direction with respect to the conveyor, and having a second supporting surface; and a recording part recording an image on the sheet supported by the second supporting surface.

11 Claims, 9 Drawing Sheets

(56) References Cited

FOREIGN PATENT DOCUMENTS

| | | | |
|---|---|---|---|
| JP | 2014005120 | A | 1/2014 |
| JP | 2014079977 | A | 5/2014 |
| JP | 2017056653 | A | 3/2017 |
| JP | 6176374 | B1 | 8/2017 |
| JP | 2017165022 | A | 9/2017 |
| JP | 2021095232 | A | 6/2021 |

* cited by examiner

IMAGE RECORDING APPARATUS

CROSS REFERENCE TO RELATED APPLICATIONS

The present application claims priority from Japanese Patent Application No. 2021-108036, filed on Jun. 29, 2021, the disclosure of which is incorporated herein by reference in its entirety.

BACKGROUND

The present disclosure relates to an image recording apparatus such a printer.

A printer is known as an example of the image recording apparatus. In a certain publicly known printer, a label sheet (label paper sheet) is fed from rolled paper, and is conveyed along a conveying route which reaches a paper sheet discharge port via a location on a platen facing a recording head. A pair of side guides is arranged upstream of the platen in the conveying route. The both side guides make contact, respectively, with end edges in a width direction of the label sheet, and guide the label sheet in a conveying direction. A roller pair is arranged downstream of the side guides in the conveying route. The roller pair is rotated by a driving force generated in a motor, nips the label sheet guided by the side guides, and conveys the label sheet to the downstream in the conveying direction. A suction-attraction platen unit provided with a platen, a pump, etc., is arranged on the downstream of the roller pair in the conveying route. The pump sucks air from a plurality of suction ports formed in a surface of the platen, and prevents the label sheet from floating from the surface of the platen. The recording head is arranged at a location above the platen. The recording head forms an image on the label sheet supported by the surface of the platen.

SUMMARY

According to an aspect of the present disclosure, there is provided a printer including: a conveyor; a first supporting part; a side guide; a suction attraction force generator; a second supporting part; and a head. The conveyor is configured to convey a sheet in a conveying direction. The first supporting part is positioned upstream of the conveyor in the conveying direction. The supporting part includes a first supporting surface. The side guide is configured to make contact with at least one of both ends, in a width direction of the sheet, in the first supporting surface. The width direction is orthogonal to the conveying direction and parallel to the first supporting surface. The suction-attraction force generator is configured to generate a suction-attraction force in an area, in the first supporting surface, which is adjacent to the side guide and in which the sheet passes. The second supporting part is positioned downstream of the conveyor in the conveying direction. The second supporting part includes a second supporting surface. The head is configured to record an image on the sheet supported by the second supporting surface.

According to the printer of the present disclosure, it is possible to suppress any buckling of the sheet in the area which is adjacent to the side guide arranged upstream of the conveyor.

DETAILED DESCRIPTION

Figure 1A:
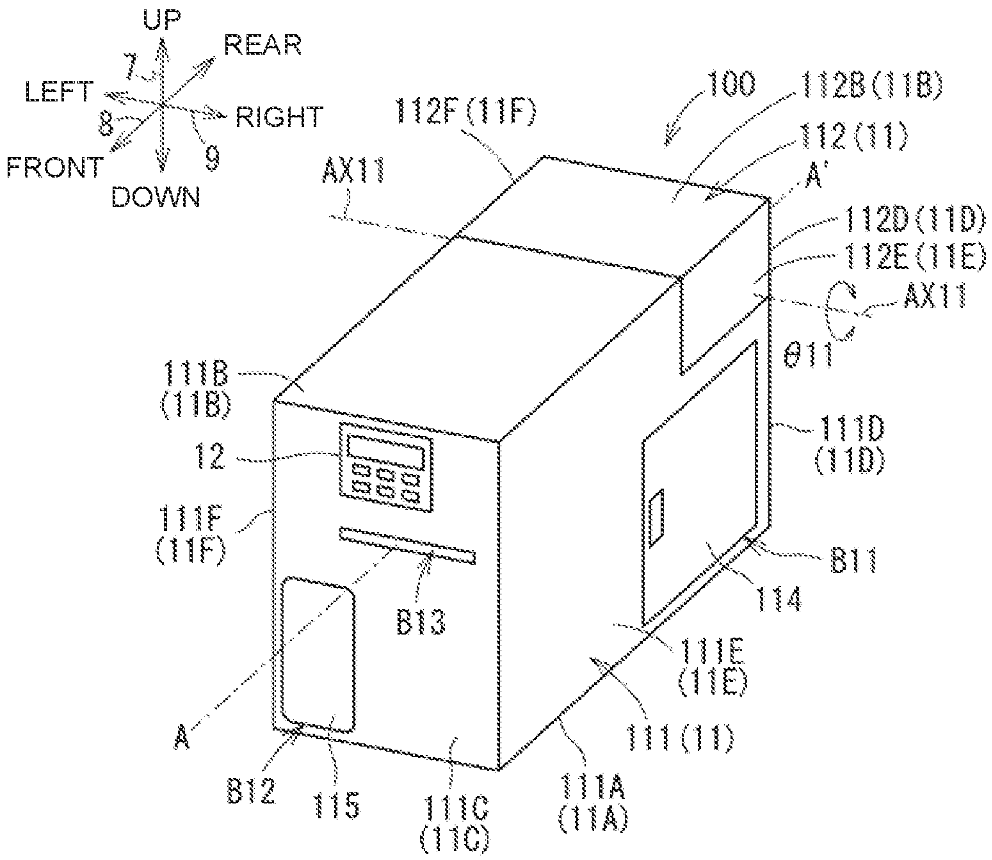
FIG. 1A is a perspective view depicting the outer appearance of a printer 100.

In the above-described publicly known printer, after the roller paper is installed in the printer, a user pulls out a label sheet from the rolled paper, and causes the label sheet to pass between the side guides. Afterwards, the user moves the side guides in the width direction, and positions (aligns the position of) the center in the width direction of the label sheet with respect to the center in the width direction of the side guides. In such a case, however, that the side guides are moved toward the center thereof in a main scanning direction so that a distance between the side guides becomes to be shorter than the width of the label sheet, the label sheet buckles so as to swell upward between the side guides, in some cases.

In a case that image recording is (being) performed, the label sheet is conveyed to the paper sheet discharge port, any moment is generated in the label sheet between the side guides due to, for example, any swaying of the respective rollers, and an end edge or edges of the label sheet receive(s) a contact force (namely, a force oriented toward the center in the width direction) from the side guides, in some cases. As a result, the label sheet buckles so as to swell upward between the side guides, and skews with respect to the conveying direction, in some cases. In particular, in a situation that the label sheet buckles before the image recording and that the label sheet which is being conveyed skews, the label sheet is deformed to a greater extent due to the buckling thereof.

In order to avoid the buckling due to the side guides, it is considered to separate, to a slight extent, the side guides from the end edge(s) in the width direction of the label sheet. However, in a case that any moment is generated in the label sheet which is (being) conveyed, the label sheet easily skews between the side guides. Since the label sheet is also a continuous sheet, the position of the label sheet, which once skews, is deviated in the width direction from the position thereof in an accumulated manner, and eventually buckles, in some cases.

In a case that the label sheet buckles between the side guides, the label sheet is conveyed to the surface of the platen, as the label sheet skews. However, conventionally, a person skilled in the art does not recognize a task regarding the bucking of the label sheet between the side guides which are arranged upstream of the roller pair, and there is not any known technique for suppressing the bucking of the label sheet between the side guides.

Among publicly known printers, there is a printer having such a configuration wherein a label sheet is made to be (conveyed) along a single side guide which is arranged upstream of the platen, and in which a roller, etc., is not movable in the width direction. In such a configuration also, there is such a fear that the label sheet might buckle due to a contact force from the side guide.

In an embodiment of the present disclosure which is to be described in the following, there is provided a technique for suppressing any buckling of a sheet in an area which is adjacent to a side guide arranged upstream of a conveyor.

In the following, a printer 100 according to an aspect of the present disclosure will be explained. Note that the following embodiment is merely an example of the present disclosure; it is needless to say that the present embodiment can be appropriately changed or modified, within a range not changing the gist and spirit of the present disclosure.

<Definition>

In the following explanation, advancement or movement (progress) directed from a starting point to an end point of an arrow is expressed as an "orientation", and going forth and back on a line connecting the starting point and the end point of the arrow is expressed as a "direction".

An up-down direction 7 is defined, with a state in which the printer 100 is installed usably (a state of FIG. 1A), as the reference. A front-rear direction 8 is defined, with a side on which a discharge port B13 is provided in the printer 100 is defined as a front side (front surface); and a left-right direction 9 is defined, with the printer 100 as seen from the front side (front surface).

<Image Recording System, Sheet S>

In FIG. 1, the printer 100 records an image on a sheet S by an ink-jet recording system.

The sheet S is label rolled paper (an example of rolled paper), and has a sheet core 41, a separator 42 and a plurality of labels 43. The sheet core 41 is, for example, a tube made of hard paper. The separator 42 is an example of continuous paper, and is wound in a roll shape around the sheet core 41 from the inner side to the outer side, thereby constructing a roll body. Each of the plurality of labels 43 is temporarily adhered to a main surface 421 in an outer orientation R11 in the separator 42, with a sticky (adhesive) layer (not depicted in the drawings) formed in a main surface 431 in an inner orientation R12 in the separator 42, at a spacing distance therebetween in a circumferential direction θ12 of a central axis AX 12.

A plurality of kinds of the sheet S, of which sheet widths are mutually different, are installable in the printer 100. The sheet width is a distance between the both ends in a width direction 9A of the sheet S. The width direction 9A is a direction in which the central axis 12AX extends.

<Casing 11 of Printer 100>

In FIG. 1A, the printer 100 is provided with a casing 11. The casing 11 has a substantially parallelepiped shape which is long in the front-rear direction 8 and has a size which is placeable on a table, a floor surface or a rack. The casing 11 demarcates, from the outside, an inner space SP11 (see FIGS. 2A and 2B) which has a substantially parallelepiped shape, with a bottom wall 11A, an upper wall 11B, a front wall 11C, a rear wall 11D, a right wall 11E and a left wall 11F. The casing 11 has a casing case 111 and a casing cover 112.

The casing case 111 demarcates, from the outside, a first space SP111 (see FIG. 2A) with a bottom wall 111A, an upper wall 111B, a front wall 111C, a rear wall 111D, a right wall 111E and a left wall 111F. The first space SP111 is a space which does not include an upper rear corner part in the inner space SP11 (namely, a second space SP112 which is to be described later on). The upper rear corner part of the casing case 111 is an opening AP111 which is oriented rearward and upward.

The casing cover 112 has a substantially parallelepiped shape which is long in the left-right direction 9, and demarcates a second space SP112 by an upper wall 112B, a rear wall 112D, a right wall 112E and a left wall 112F. The second space SP112 is a space having a parallelepiped shape and occupying the upper rear corner part in the inner space SP11.

The bottom wall 11A is the bottom wall 111A. The front wall 11C is the front wall 111C. The upper wall 11B is constructed of the upper wall 111B and the upper wall 112B. The rear wall 11D is constructed of the rear wall 111D and the rear wall 112D. The right wall 11E is constructed of the right wall 111E and the right wall 112E. The left wall 11F is constructed of the left wall 111F and the left wall 112F.

Figure 2A:
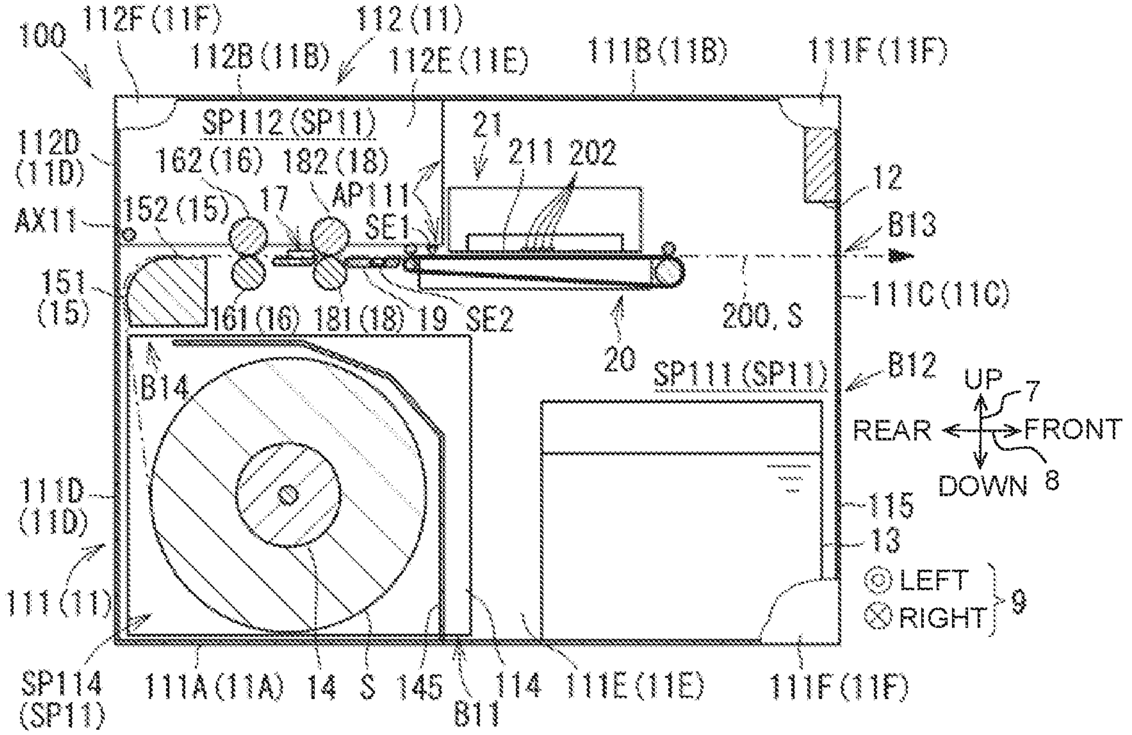
FIG. 2A is a schematic view depicting a vertical cross section of the printer 100 along a line A-A' in FIG. 1.
Figure 2B:
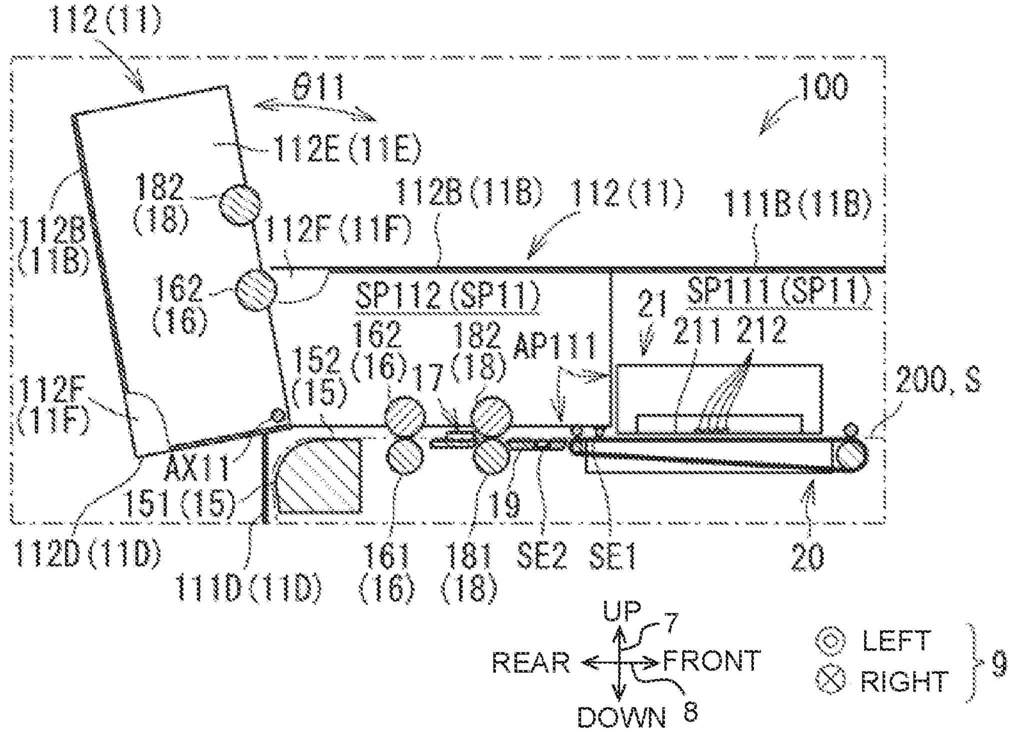
FIG. 2B is a schematic view depicting a close position P11 and an open position P12 of a casing cover 112.

In FIGS. 2A and 2B, the casing cover 112 is rotatable, in a circumferential direction θ11 of a rotational axis AX11, between a close position P11 and an open position P12. As depicted in FIG. 2A, the casing cover 112 located at the close position P11 makes contact with a circumferential edge, in the casing case 111, which surrounds the opening AP111, and closes the opening AP111. As depicted in FIG. 2B, the casing cover 112 located at the open position P12 is separated from an upper rear corner position in the casing case 111 in the circumferential direction θ11, and opens or release the opening AP111. This allows a user to access, from the outside of the casing 11, to a tensioner 15, a rear conveyor 16, a side guide unit (hereinafter abbreviated also as a "unit") 17, and a front conveyor 18. An open/close sensor SE1 outputs, to the controller 27, a signal of which level is different between a case that the casing cover 112 is at the close position P11 and a case that the casing cover 112 is not at the close position P11 (see FIG. 3). In the following, unless particularly noted, the term "casing cover 112" me the casing cover 112 which is at the close position P11.

In FIG. 1A, the discharge port B13 is formed in the front wall 111C at a location close to an upper end of the front wall 111C. The discharge port B13 is a hole which is long in the left-right direction 9 and which penetrates the front wall 111C. A sheet S on which an image has been recorded is discharged from the discharge port B13.

An operation panel 12 (an example of an "input interface") which is operated by a user is positioned in the front wall 111C. In the following, the term "interface" is abbreviated as "IF". The operation panel 12 includes at least a start button of image recording, etc., and transmits an operation signal indicating that the start button is operated to the controller 27 (see FIG. 3).

An opening B12 is formed in the front wall 111C at a left lower corner thereof, and a front cover 115 is attached to the opening B12. By opening or closing the front cover 115, a tank 13 (see FIG. 2A) is exposed or shielded.

An opening B11 is formed in the right wall 111E at a location in the vicinity of a rear end of the right wall 111E, and a right cover 114 is attached to the opening B11. The right cover 114 is slid frontward or rearward to thereby open or close the opening B11. By opening or closing the right cover 114, a roll supporting part 14 (see FIG. 2A) is exposed or shielded.

<Internal Configuration of Printer 100>

In FIGS. 2A and 2B, the printer 100 is provided with, in the internal space SP11, the open/close sensor SE1, the operation panel 12, the tank 13, the roll supporting part 14, a tensioner 15, the rear conveyor 16, the unit 17, the front conveyor 18, a lower guide 19, a seat sensor SE12, a belt conveying mechanism 20, and a recording head 21.

The tensioner 15, a driving roller 161 in the rear conveyor 16, the unit 17, a driving roller 181 of the front conveyor 18, the lower guide 19 and the belt conveying mechanism 20 are supported by the left wall 111F and the right wall 111E and extend leftward and rightward.

A pinch roller 162 in the rear conveyor 16 and a pinch roller 182 of the front conveyor 18 are supported by the left wall 112F and the right wall 112E and extend leftward and rightward. Accordingly, the pinch rollers 162 and 182 rotate or pivot together with the casing cover 112 (see FIG. 2B).

Figure 3:
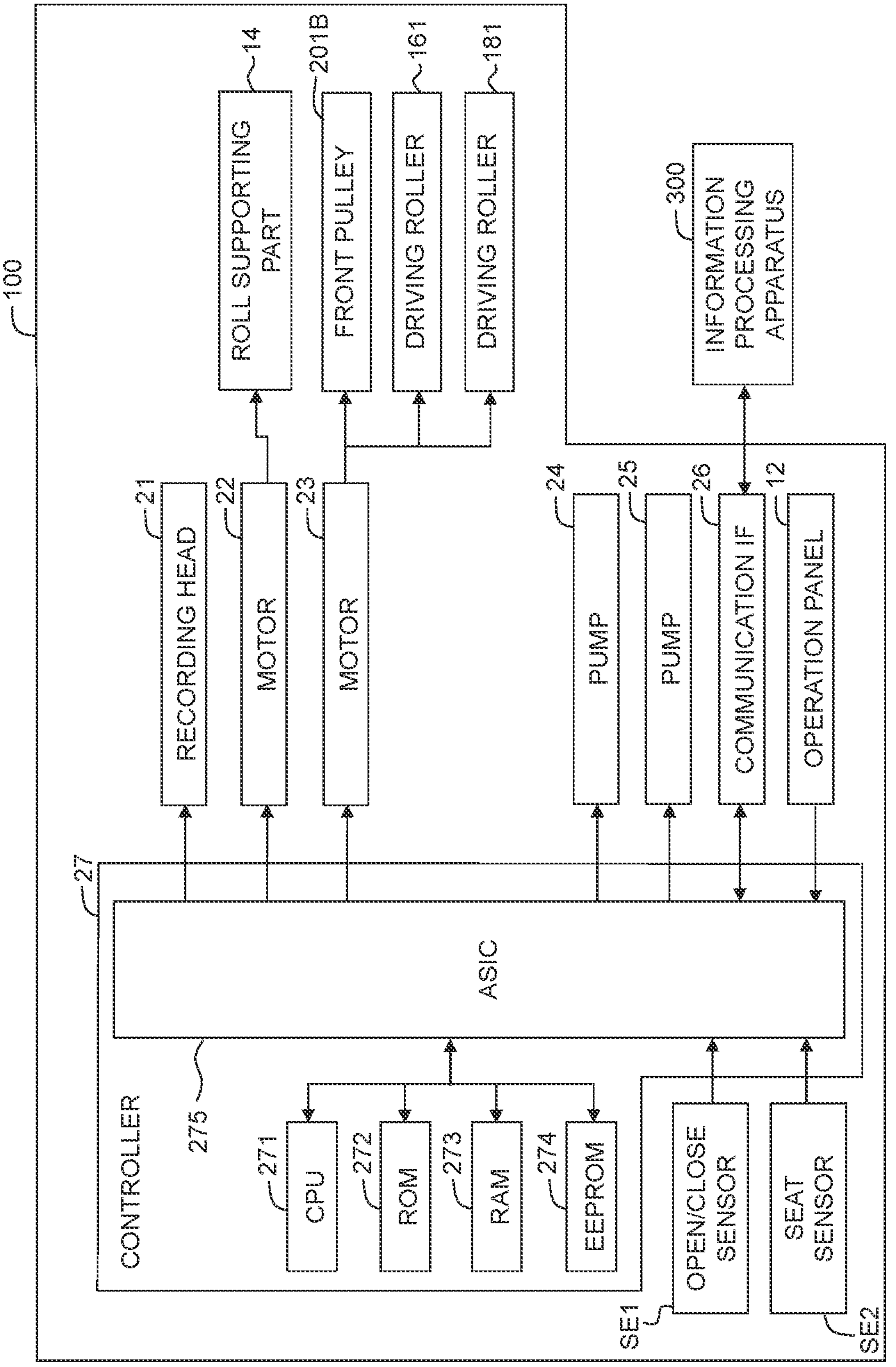
FIG. 3 is a block diagram of the printer 100.

In FIG. 3, the printer 100 is further provided with a motor 22, a motor 23, a pump 24, a pump 25, a communication interface 26 and the controller 27.

<Tank 13>

In FIG. 2A, the tank 13 is located on the bottom wall 111A at a location immediately behind the front cover 115, and stores an ink in the inside of the tank 13. The ink in the tank 13 is supplied to the recording head 21 via an ink tube (not depicted in the drawings).

<Roll Supporting Part 14 (an Example of a Roll Supporting Member)>

In the first space SP111, a roll accommodating space SP114 is defined by a partition wall 145, at a location on the left side with respect to the opening B11. A gap B14 from the right wall 111E and reaching up to the left wall 111F is defined between a rear end of the partition wall 145 and the rear wall 111D. A sheet S which is conveyed between the roll supporting part 14 and the tensioner 15 passes the gap B14.

Figure 4A:
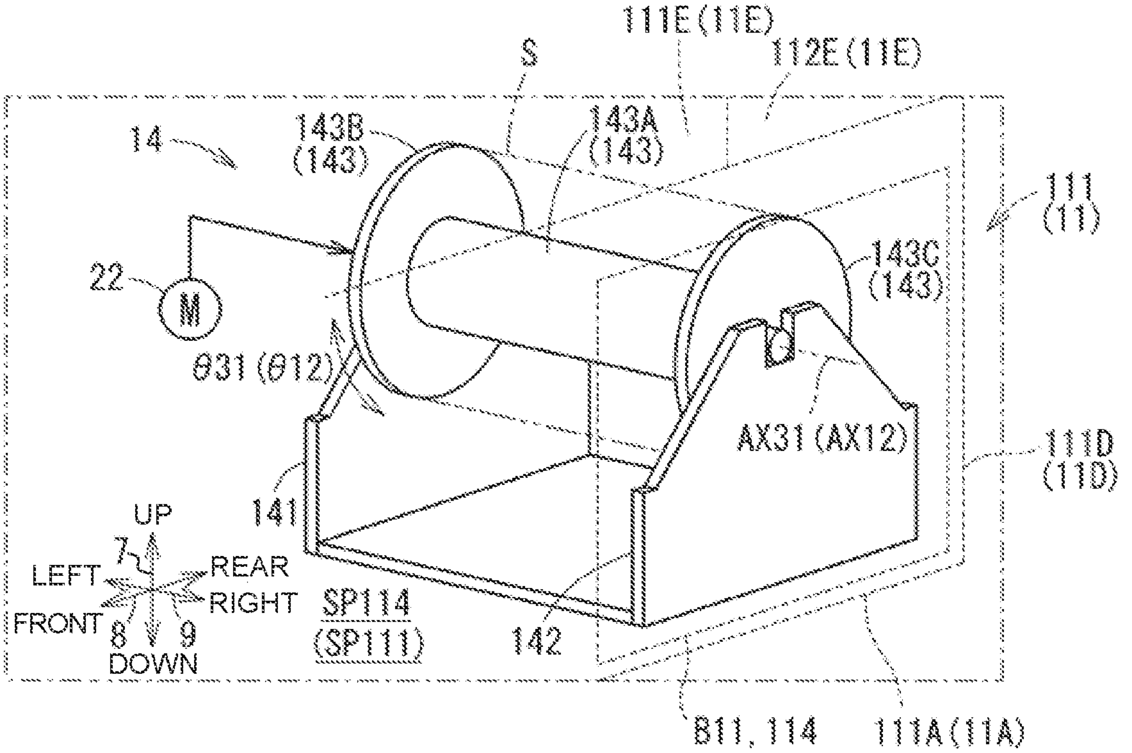
FIG. 4A is a perspective view depicting the outer appearance of a roll supporting part 14.
Figure 4B:
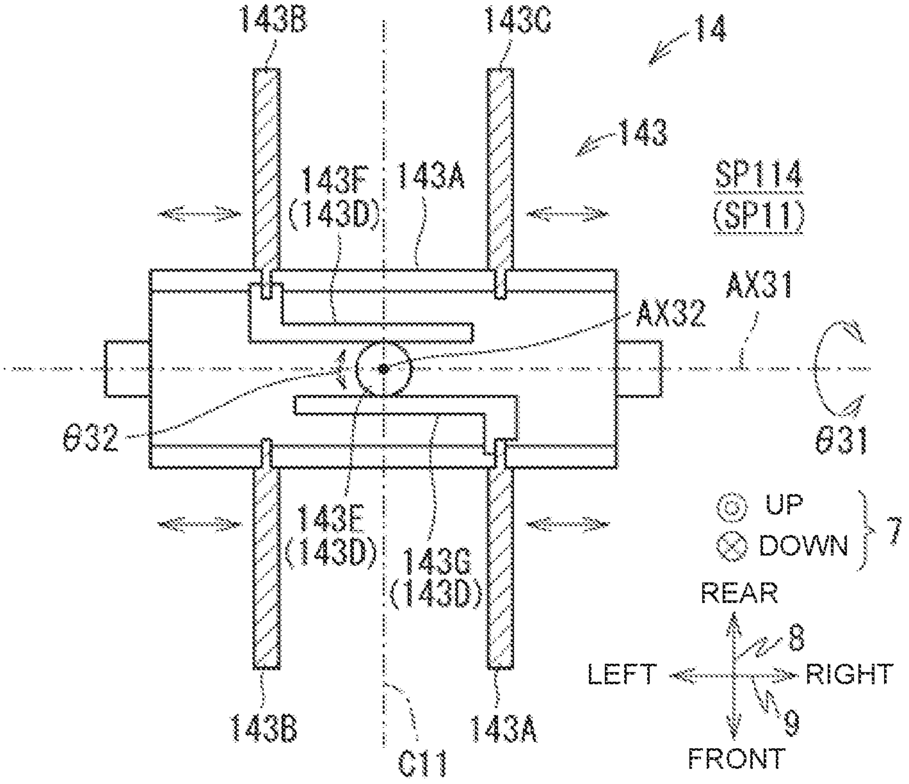
FIG. 4B is a cross-sectional view depicting a detailed configuration of a roll holder 143.

In FIGS. 4A and 4B, the roll supporting part 14 is an example of a "roll supporting member", and is located in the roll accommodating space SP114. A roll body having the sheet S wound therearound is installed in the roll supporting part 14 to be rotatable in a circumferential direction θ12 of the central axis AX12.

The roll supporting part 14 is provided with a pair of supporting parts 141 and 142, and a roll holder 143. The supporting parts 141 and 142 are plate-shaped members, respectively, which are positioned in the bottom wall 114A to be apart from each other in the left-right direction 9, and each of which extend in the up-down direction 7 and the front-rear direction 8. The roll holder 143 is provided with a holder core 143A, a pair of flanges 143 and 143C, and a rack-and-pinion mechanism 143D constructed of a rack and a pinion.

The holder core 143A has a substantially cylindrical shape, and is placed across between upper ends, respectively, of the supporting parts 141 and 142 to be rotatable about a central axis AX 13 extending in the left-right direction 9. An inner circumferential surface of the sheet core 41 (see FIG. 1B) is inserted into an outer circumferential surface of the holder core 143A. In a case that the roll holder 143 is positioned between the supporting parts 141 and 142, the roll holder 143 is mechanically connected to the motor 22 via a gear, etc. The roll holder 143 rotates in a circumferential direction θ31 by a driving force generated by the motor 22, and feeds out the sheet S forming the roll body from the sheet core 41 or winds (takes) the sheet S around the sheet core 41.

The flange parts 143B and 143C are positioned to be apart from a sheet passing center C11 leftward and rightward by equal distances in the outer circumferential surface of the holder core 143A, and protrude to a radial direction of the central axis AX31. The sheet passing center C11 is a virtual plane which includes a central axis AX32 of a pinion gear 143E (see FIG. 4B), and which is parallel to the up-down direction 7 and the front-rear direction 8. In the following, a term "left-right symmetric" means being left-right symmetric with respect to the sheet passing center C11, unless particularly noted.

The rack-and-pinion mechanism 143D has, in the inside of the holder core 143A, the pinion gear 143E and a pair of rack gears 143F and 143G; in response to movement of either one of the flange parts 143B and 143C leftward or rightward on the outer circumferential surface of the holder core 143A, the rack-and-pinion mechanism 143D causes the other of the flange parts 143B and 143C to move rightward or leftward by a distance equal to the foregoing movement. The respective flange parts 143B and 143C make contact with the sheet S installed in the holder core 143A from the both ends in the width direction 9A, and align the center in the width direction of the sheet S with the sheet passing center C11.

For installation of the sheet S, the roll supporting part 14 is constructed to be removable or detachable from the supporting parts 141 and 142. The flange part 143C is constructed to be removable rightward from the holder core 143A.

<Tensioner 15>

In FIGS. 2A and 2B, the tensioner 15 is located at a position above the gap B1, and has a curve surface 151 and an upward oriented surface 152. The curve surface 151 is curved as approaching, from a lower end thereof, toward an upper end thereof, and is oriented substantially upward. The upward oriented surface 152 is a flat surface continued from the upper end and a front end of the curved surface 151, and extending in the front-rear direction 8 and the left-right direction 9. The position in the up-down direction of the upward oriented surface 152 is substantially same as that of the discharge port B13. A conveying route 200, of the sheet S, which reaches up to the discharge port B13 is extended linearly from the upward oriented surface 152. The sheet S pulled out from the roll holder 143 is placed on the tensioner 15. The tensioner 15 is urge rearward by an urging member such as a spring, etc. With this, tension is applied to the sheet S placed on the tensioner 15.

<Rear Conveyor 16, Front Conveyor 18>

In FIGS. 2A and 2B, the rear conveyor 16 is an example of a "second conveyor", and has a driving roller 161 and a pinch roller 162 contacting each other at a location in front of the tensioner 15. The front conveyor 18 is an example of a "conveyor", and has a driving roller 181 and a pinch roller 182 contacting each other at a location in front of the rear conveyor 16. The driving roller 161 and the pinch roller 162, and the driving roller 181 and the pinch roller 182 nip the sheet S extending frontward from the tensioner 15. Each of the driving rollers 161 and 181 is rotated about a rotational axis extending leftward and rightward, by the driving force generated by the motor 23 (see FIG. 3), and the pinch rollers 162 and 182 are rotated following, respectively, of the rotations of the driving rollers 161 and 181. With this, the rear conveyor 16 and the front conveyor 18 convey the sheet S fed out from the roll body further frontward (an example of a "conveying direction") or conveys the sheet S, which is to be wound around the roll body, rearward.

<Unit 17>

Figure 5A:
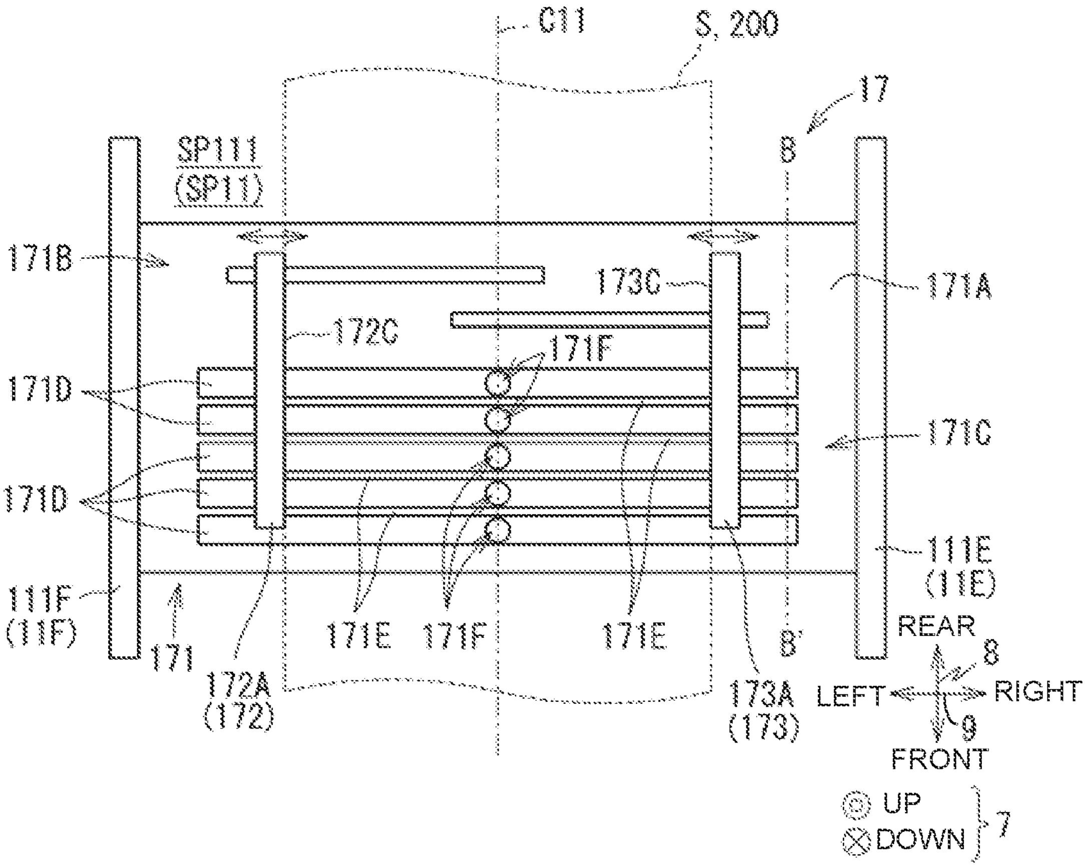
FIG. 5A is a top view of a side guide unit 17.
Figure 5B:
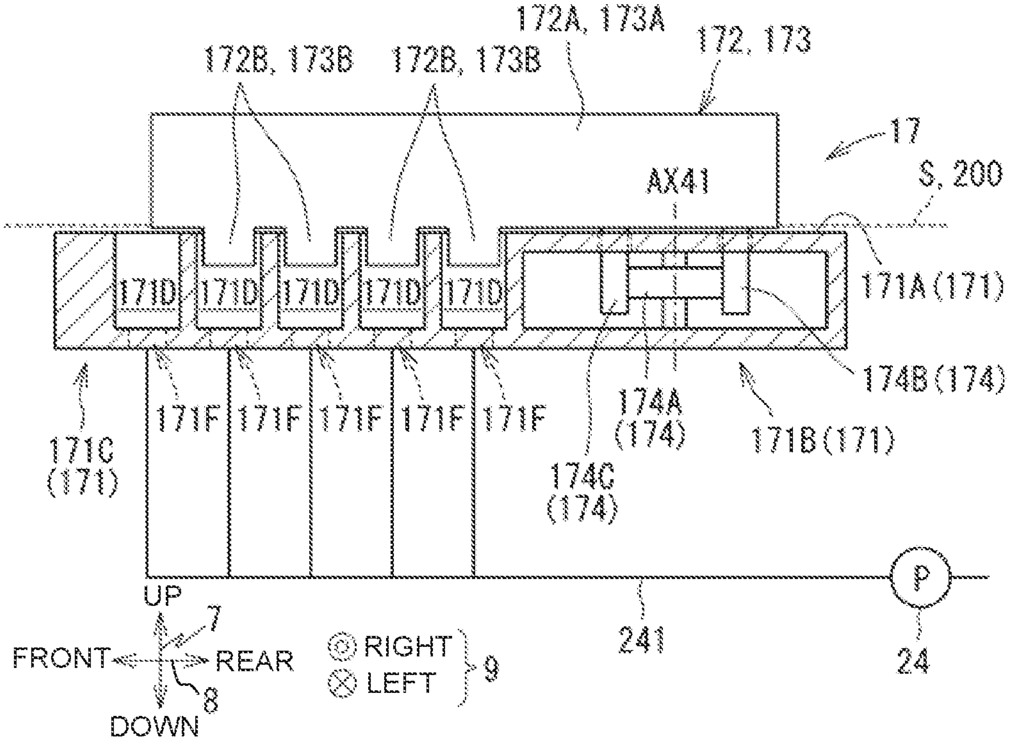
FIG. 5B is a vertical cross-sectional view of the side guide unit 17 along a line B-B' in FIG. 5A.

In FIGS. 2A and 2B, the unit 17 is located at a location which is in front of the rear conveyor 16 and behind the front conveyor 18. In FIGS. 5A and 5B, the unit 17 is provided with a base 171, a pair of guide members 172 and 173, and a rack-and-pinion mechanism 174.

The base 171 is an example of a "first supporting part", and has a supporting surface 171A. The supporting surface 171A is an example of a "first supporting surface", and defines a lower end of the conveying route 200 at an upper end of the base 171. The base 171 has an accommodating part 171B and a groove part 171C. The accommodating part 171B is a part close to a rear end in the base 171, and accommodates the rack-and-pinion mechanism 174 in the inside thereof. The groove part 171C is located in front of the accommodating part 171B in the base 171. In the groove part 171C, a plurality of grooves 171D are arranged in the front-rear direction 8, respectively, via partition walls 171E. Each of the plurality of grooves 171D is recessed downward from the supporting surface 171A, is longer in the left-right direction 9 than a maximum width of the sheet (maximum sheet width), and has an outer shape which is left-right symmetric. An upper end of each of the plurality of grooves 171D is an opening which is oriented upward in a state that the sheet S is not present on the supporting surface 171A. The plurality of grooves 171D includes a groove 171D which is positioned in front of the guide members 172 and 173. In a bottom part of each of the plurality of grooves 171D, a through hole 171F penetrating the bottom part in the up-down direction 7 is formed, as a suction port, in a central part in the left-right direction 8.

The guide member 172 is an example of a "side guide", and has a main body 172A and a plurality of projected parts 172B. The main body 172A is positioned, on the supporting surface 171A, on the left side with respect to the sheet passing center C11. In the main body 172A, a right end surface 172C of the main body 172A is parallel to the up-down direction 7 and the front-rear direction 8 between both ends thereof, in the front-rear direction 8. In the main body 172A, a part close to a rear end thereof is positioned on the accommodating part 171B, and a part close to the front end thereof is positioned on the groove part 171C. The plurality of projected parts 172B are connected to a lower end of the main body 172A and project downward, and are positioned, respectively, inside the plurality of grooves 171D. The main body 172A and the respective projected parts 172B are continued without any gap (break and/or interruption).

The guide member 173 is an example of the "side guide", and has a main body 173A and a plurality of projected parts 173B. The main body 173A has a left end surface 173C. The main body 173A, the respective projected parts 173B and the left end surface 173C have, respectively, shapes which are left-right symmetric with respect to the main body 172A, the respective projected parts 172B and the right end surface 172C.

In FIG. 5B, the rack-and-pinion mechanism 174 has, in the inside of the base 171, a pinion gear 174A and a pair of rack gears 174B and 174C; in response to movement of either one of the guide members 172 and 173 leftward or rightward by an operation of a user, the rack-and-pinion mechanism 174 causes the other of the guide members 172 and 173 to move rightward or leftward by a distance equal to the foregoing movement. The respective guide members 172 and 173 make contact with the sheet S which passes therebetween, from both sides in the left-right direction 9, respectively. With this, the center in the width direction of the sheet S is aligned with a left-right position of the central axis AX41 of the pinion gear 174A (namely, the sheet passing center C11).

<Lower Guide 19, Seat Sensor SE2>

In FIGS. 2A and 2B, in the front-rear direction 8, the lower guide 19 is positioned between the front conveyor 18, and the belt conveying mechanism 20 and the recording head 21. The lower guide 19 has an upper end surface defining the lower end of the conveying route 200. The seat sensor SE2 is embedded in the center in the left-right direction 9 of the upper end surface, at a location below the upper end surface. The seat sensor SE2 has a light-emitting element and a light-receiving element; the light-emitting element emits a light to a detection position set within the upper end surface of the lower guide 19, and the light-receiving element has a light-receiving surface oriented toward the detection position, and outputs, to the controller 27, a signal of which level is different depending on a receiving light amount (see FIG. 3). In the present embodiment, in a case that the sheet S is located at the detection position, the level of the signal is made to be a high level.

<Belt Conveying Mechanism 20>

Figure 6:
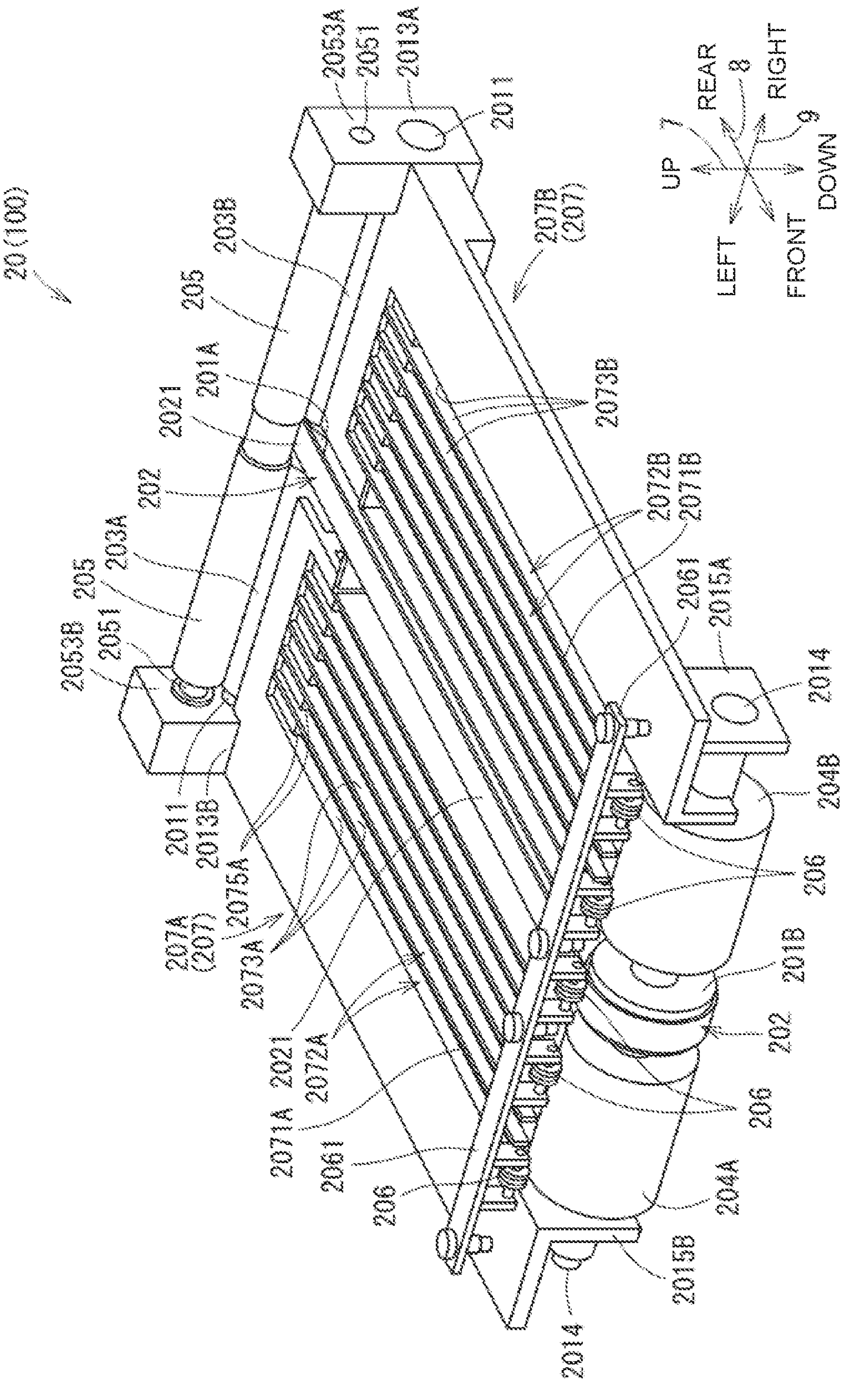
FIG. 6 is a perspective view of a belt conveying mechanism 20.

As depicted in FIGS. 2A and 2B, the belt conveying mechanism 20 is arranged, in the front-rear direction 8, between the lower guide 19 and the discharge port B13. In FIG. 6, the belt conveying mechanism 20 is provided with a rear pulley 201A, a front pulley 201B, an endless belt 202, rear rollers 203A and 203B, front rollers 204A and 204B, a pinch roller 205, a plurality of contact members 206 and a suction-attraction platen 207.

The rear pulley 201A is arranged to be left-right symmetric at a location in front of, to some extent, the lower guide 19. A rear shaft 2011 is extended leftward and rightward from a shaft hole of the rear pulley 201A. The rear shaft 2011 is supported by shaft bearings 2013A and 2013B provided, respectively, on the right wall 111E and the left wall 111F (see FIGS. 1A and 1B) to be rotatable about a central axis extending leftward and rightward.

The front pulley 201B is arranged to be left-right symmetric at a location in front of the rear pulley 201A. A front shaft 2014 is extended leftward and rightward from a shaft hole of the front pulley 201B. The front shaft 2014 is supported by shaft bearings 2015A and 2015B provided, respectively, on the right wall 111E and the left wall 111F to be rotatable about a central axis extending leftward and rightward. The front pulley 201B is rotated about the front shaft 2014 by a driving force generated in the motor 23 (see FIG. 3).

The endless belt 202 is a part of a "second supporting part", is wound around the rear pulley 201A and the front pulley 201B, and has an upper end surface 2021 extending between the upper ends, respectively, of the rear pulley 201A and the front pulley 201B. The upper end surface 2021 is a part of a "second supporting surface", and defines the lower end of the conveying route 200. The upper end surface 2021 is driven, by the rotation of the front pulley 201B, in the front-rear direction 8 between the upper end of the rear pulley 201A and the upper end of the front pulley 201B. A width in the left-right direction 9 of each of the rear pulley 201A, the front pulley 201B and the endless belt 202 is greatly narrower than the maximum sheet width.

Each of the rear rollers 203A and 203B is, for example, a rubber roller in which a roller core is covered by an elastic material such as rubber, etc., and the rear rollers 203A and 203B are attached to the rear shaft 2011 so that the rear rollers 203A and 203B are left-right symmetric while sandwiching the rear pulley 201A therebetween. Each of the front rollers 204A and 204B is, for example, a rubber roller similarly to the rear rollers 203A and 203B, and the front rollers 204A and 204B are attached to the front shaft 2014 so that the front rollers 204A and 204B are left-right symmetric while sandwiching the front pulley 201B therebetween. Respective upper ends of the rear rollers 203A and 203B and of the front rollers 204A and 204B are at a location of a same height with or lower than the upper end surface 2021. A left-right distance between a left end of the rear roller 203A and a right end of the rear roller 203B, and a left-right distance between a left end of the front roller 204A and a right end of the front roller 204B are longer than the maximum sheet width.

The pinch roller 205 is a rubber roller, etc., and is supported by a shaft bearing 2053A of the right wall 111E and a shaft bearing 2053B of the left wall 111F to be rotatable about a central axis extending leftward and rightward. The pinch roller 205 makes contact with the rear pulley 201A, the rear rollers 203A and 203B from a location immediately thereabove, and is rotated following the rotations of the rear pulley 201A, the rear rollers 203A and 203B.

Each of the plurality of contact members 206 is a spur, and are supported by a spur holder 2061 to be rotatable in a circumferential direction of a rotation axis parallel to the left-right direction 9. The plurality of contact members 206 are aligned in a row in the left-right direction 9, with a spacing distance therebetween; the plurality of contact members 206 make contact with the endless belt 202 and the front rollers 204A and 204B from a location immediately thereabove, and are rotated following the rotations of the endless belt 202 and the front rollers 204A and 204B.

<Suction-Attraction Platen 207>

The suction-attraction platen 207 has side parts 207A and 207B which are left-right symmetric while sandwiching the endless belt 202 therebetween, at a location between the rear pulley 201A and the front pulley 201B, in the front-rear direction 8.

The side part 207A is another part of the "second supporting part", and has a supporting surface 2071A. The supporting surface 2071A is another part of the "second supporting surface", and defines the lower end of the conveying route 200 at an upper end of the side part 207A. In the side part 207A, a plurality of grooves 2072A are arranged side by side in the left-right direction 9, respectively, via partition walls 2073A. Each of the plurality of grooves 2072A is recessed downward from the supporting surface 2071A, and extends to be elongated in the front-rear direction 8 between the rear pulley 201A and the front pulley 201B. A front end and an upper end of each of the plurality of grooves 2072A is an opening oriented upward in a state that the sheet S is not present on the suction-attraction platen 207. In a bottom part of each of the plurality of grooves 2072A, a through hole 2074A (see FIG. 8) penetrating the bottom part in the up-down direction 7 is formed, as a suction port, in the vicinity of the rear end 2075A.

The side part 207B has the supporting surface 2071B, a plurality of grooves 2072B, a plurality of partition walls 2073B, and a plurality of through holes 2074B. Since the side part 207B is left-right symmetric with respect to the side part 207A, any detailed explanation thereof will be omitted.

<Recording Head 21>

In FIGS. 2A and 2B, the recording head 21 is an example of a "head", and is a line head, a serial head, etc. The recording head 21 faces or is opposite to the upper end surface 2021 of the endless belt 202 (see FIG. 6) and the upper end of the suction-attraction platen 207 at a location thereabove, and is arranged to traverse (cross) the suction-attraction platen 207 in the left-right direction 9.

The recording head 21 has a lower surface which has a substantially rectangular shape in a plane view, as a nozzle surface 211. A plurality of nozzles 212 are aligned in the front-rear direction 8 and the left-right direction 9 in the nozzle surface 211. The recording head 21 stores the ink supplied from the tank 13 in an ink chamber provided in the inside of the recording head 21. Under a control by the controller 27, the recording head 21 discharges or ejects the ink stored in the ink chamber toward a label 43 in the sheet which is conveyed at a location immediately below the recording head 21. With this, an image is recorded on the sheet S. The sheet S for which the recording has been performed is discharged to the outside of the casing 11 from the discharge port B13. By the image recording, the ink inside the ink chamber is consumed. In accordance with the consumption of the ink, the ink is supplied from the tank 13 to the ink chamber.

<Motors 22 and 23>

In FIG. 3, the motors 22 and 23 are rotated under the control by the controller 27, and generate driving forces. The driving force generated in the motor 22 is transmitted to the roll holder 143. The driving force generated in the motor 23 is transmitted to the front pulley 201B and the driving rollers 161 and 181 via a gear, etc.

<Pumps 24 and 25>

Figure 8:
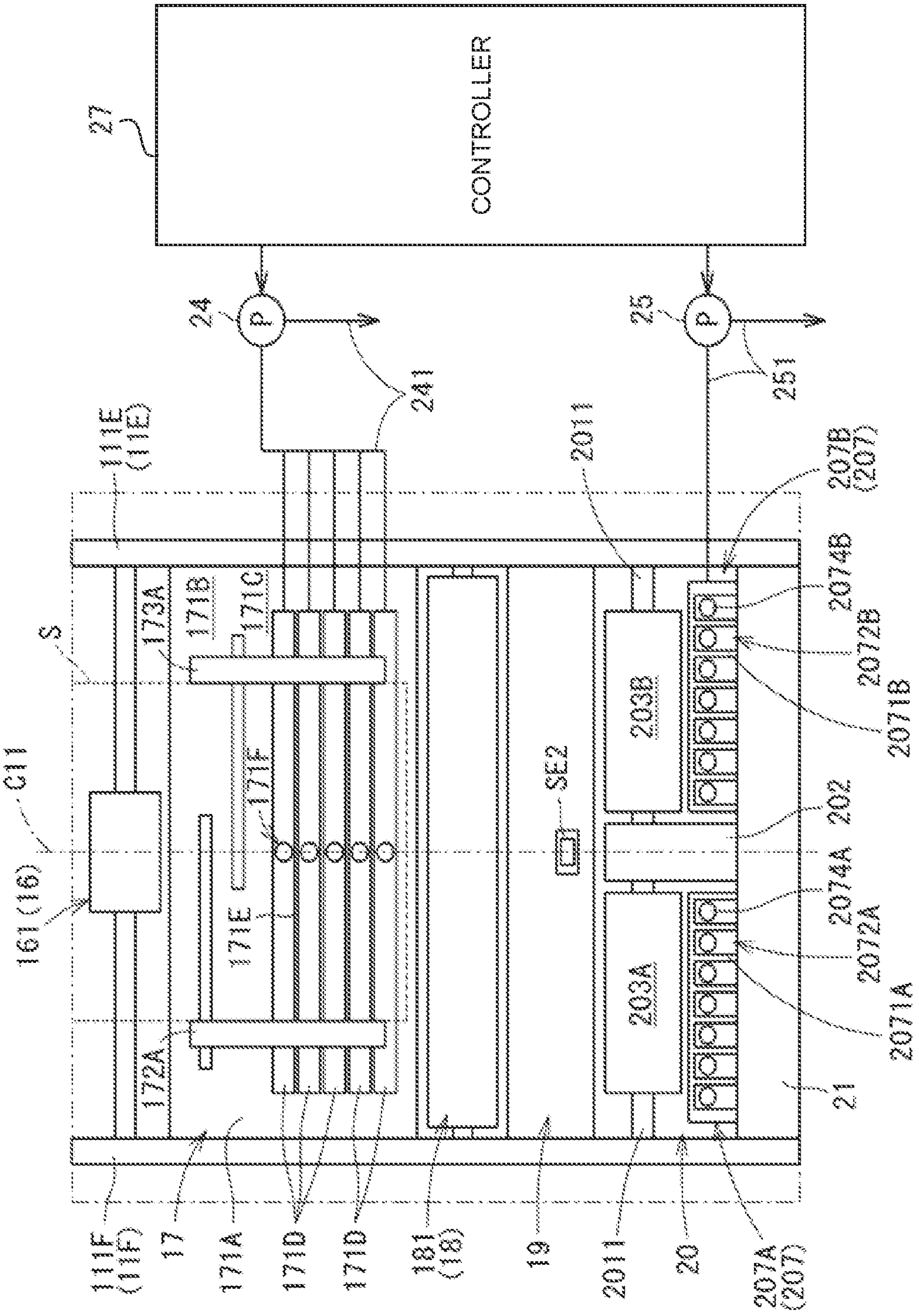
FIG. 8 is a schematic view depicting main parts of the printer 100.

The pump 24 is communicated with the respective through holes 171F via a piping 241 (see FIGS. 5B and 8). The pump 24 is driven under the control by the controller 27, and sucks air inside each of the plurality of grooves 171D from one of the through holes 171F.

The pump 25 is communicated with the respective through holes 2074A and 2074B via a piping 251 (see FIG. 8). The pump 25 is driven under the control by the controller 27, and sucks air inside each of the plurality of grooves 2072A and 2072B from one of the through holes 2074A and 2074B.

<Communication IF 26>

The communication IF 26 receives transmit data from an information processing apparatus 300 communicatively connected to the printer 100. The communication IF 26 transmits the data received under the control by the controller 27 to a RAM 273 via an ASIC 275.

<Controller 27>

The controller 27 is provided with a CPU 271, a ROM 272, the RAM 273, an EEPROM 274 and the ASIC 275 which are connected to one another by an internal bus, etc., and controls the respective parts or components of the printer 100. The ROM 272 stores a control program of the printer 100, etc. The CPU 271 executes the control program, while using the RAM 273 and/or the EEPROM 274.

The recording head 21, the motors 22 and 23, the pumps 24 and 25, the open/close sensor SE1, the sheet sensor SE2, the operation panel 12, etc., are connected to the ASIC 275.

The controller 27 may be configured such that only the CPU 271 performs the various kinds of processing or that only the ASIC 275 performs the various kinds of processing, or that the CPU 271 and the ASIC 275 perform the various kinds of processing in a cooperative manner. Alternatively, the controller 27 may be configured such that one CPU singly performs the processing, or that a plurality of CPUs perform the processing in a sharing manner. Still alternatively, the controller 27 may be configured such that one ASIC singly performs the processing, or that a plurality of ASICs perform the processing in a sharing manner. Each of the ASICs may be substituted by a gate array.

<Operation of Printer 100>

In the following, an operation of the printer 100 will be explained, by dividing the operation into a setting of the sheet S and an image recording.

<Setting of Sheet S>

For the image recording, the user sets the sheet S in the printer 100. In this situation, the user opens the right cover 114 (see FIG. 1A), and then installs the sheet S in the roll supporting part 14 (see FIGS. 4A and 4B). The user moves the casing cover 112 to the open position P12, and as depicted in FIG. 2B, the user exposes the unit 17, etc., from the rear opening AP112 so that the unit 17, etc., will be accessible by the user.

In response to the separation of the casing cover 112 from the close position P11, the open/close sensor SE1 outputs, to the controller 27, a signal indicating the separation of the casing cover 112 from the close position P11 (hereinafter referred also to as a "opening signal"). The opening signal is an example of a signal indicating that the sheet S is to be set in the supporting surface 171A. In step S11 of FIG. 7A, in response to the reception of the opening signal, the controller 27 determines that the sheet S is to be set in the supporting surface 171A, the controller 27 outputs a control signal to the pump 24 to thereby drive the pump 24. The pump 24 sucks the air inside each of the grooves 171D from one of the through holes 171F. After driving the pump 24, the controller 27 stands by to receive a closing signal (to be described later on) from the open/close sensor SE1.

After the unit 17, etc., are exposed, the user pulled the sheet S installed in the roll supporting part 14 from a forward end of the sheet S and winds the sheet S on the tensioner 15, and then the user makes the sheet S to pass between the guide members 172 and 173 (see FIG. 8). The user further moves at least one of the guide members 172 and 173 leftward or rightward, and brings the guide members 172 and 173 into contact with the both ends in the width direction 9A of the sheet S on the supporting surface 171A. The position of the forward end of the sheet S is at location in front of the supporting surface 171A.

In a case that the sheet S is placed on the supporting surface 171A, a part, of each of the grooves 171D, which is close to the center in the left-right direction 9 is closed by the sheet S, and an opening oriented upward is defined at each of the both ends in the left-right direction 9 of each of the grooves 171D. By the driving of the pump 24, an air current from the both ends in the left-right direction toward the through hole 171F is generated in each of the grooves 171D. As a result, a difference in the pressure is generated between a location above the sheet S and the inside of each of the plurality of grooves 171D, thereby attracting the sheet S by suction to the supporting surface 171A. Namely, the pump 24 is an example of a "suction-attraction force generator", and generates a suction-attraction force in an area (hereinafter abbreviated also as a "sheet passing area"), in the supporting surface 171A, which is adjacent to the guide members 172 and 173 and in which the sheet S passes.

After the user brings the guide members 172 and 173 into contact with the both ends of the sheet S, the user closes the right cover 114 and returns the casing cover 112 to the close position P11 (see FIG. 2B). In response to this, the open/close sensor SE1 outputs, to the controller 27, a signal indicating that the casing cover 112 is at the close position P11 (hereinafter referred also to a "closing signal"). In the processing of step S12 of FIG. 7A, in response to the reception of the closing signal, the controller 27 stops the driving of the pump 24.

<Image Recording>

The operation panel 12 outputs the operation signal to the controller 27, in accordance with the operation of the start button by the user. In the processing of step S13 of FIG. 7A, in response to the reception of the operation signal from the operation panel 12, the controller 27 receives a signal from the seat sensor SE2.

In the processing of step S14, the controller 27 determines whether or not the received signal indicates the high level. In a case that the controller determines that the received signal indicates the high level, the controller 27 considered that the forward end of the sheet S is located in front of the detection position, and executes the processing of step S15. On the other hand, in a case that the controller 27 determines that the received signal does not indicate the high level, the controller executes the processing of step S17.

In the processing of step S15, the controller drives the pump 24 to thereby suck the air inside the respective grooves 171D and to generate a suction-attraction force F11 in the sheet passing area in the supporting surface 171A. The controller 27 further supplies a control signal to each of the motors 22 and 23 for winding up (taking up) the sheet S, to thereby rotate the driving rollers 161 and 181 and the roll holder 143 in an orientation in which the sheet S is wound up on the sheet core 41 (namely, to rotate backward or reverse the driving rollers 161 and 181 and the roll holder 143).

In the processing of step S16, the controller 27 receives the signal from the seat sensor SE2, and determines whether or not the received signal indicates a high level. In a case that the controller 27 determines that the received signal indicates the high level, the controller 27 considered that the forward end of the sheet S is still located in front of the detection position, and executes the processing of step S15. On the other hand, in a case that the controller 27 determines that the received signal does not indicate the high level, the controller 27 considered that the forward end of the sheet S is not located in front of the detection position, and the controller executes the processing of step S17.

In the processing of step S17, the controller 27 drives the pump 24 to thereby suck the air so that a flow amount (flow rate) of the air inside the respective grooves 171D becomes smaller than that of a case of executing the processing of step S15, to thereby generate a suction-attraction force F12 in the sheet passing area in the supporting surface 171A. The controller 27 further supplies, to each of the motors 22 and 23, a control signal for feeding out the sheet S. With this, the driving rollers 161 and 181 are rotated in an orientation in which the sheet S is fed out from the sheet core 41 (namely, to rotate normally the driving rollers 181 and 161), and causes also the roll holder 143 to rotate normally. Here, it is preferred that the suction-attraction force F12 is smaller than the suction-attraction force F11 and a suction-attraction force F13 (to be described later on) since there is such a possibility that the sheet S is not nipped by the front conveyor 18, which in turn might lead to such a fear that the forward end of the sheet S might be deformed.

In the processing of step S18, the controller 27 receives the signal from the sheet sensor SE2, and determines whether or not the received signal indicates a high level. In a case that the controller 27 determines that the received signal does not indicate the high level, the controller 27 considers that the forward end of the sheet S is positioned behind the detection position and executes the processing of step S17. On the other hand, in a case that the controller 27 determines that the received signal indicates the high level, the controller 27 considers that the forward end of the sheet S has reached the detection position, and executes the processing of step S19.

In the processing of step S19, the controller 27 does not stop the driving of the pump 24, and stops the normal rotations of the roll holder 143 and of the driving rollers 161 and 181.

In the processing of step S110, the controller 27 drives the pump 25 to thereby suck the air inside the respective grooves 2072A and 2072B from, respectively, the through holes 2074A and 2074B, and to generate a suction-attraction force in the sheet supporting surfaces 2071A and 2071B. The pump 25 is an example of a "second suction-attraction force generator". The controller 27 further supplies a control signal to the pump 24 to thereby switch the suction-attraction force of the pump 24 from the suction-attraction force F12 to a suction-attraction force F13 which is greater than the suction-attraction force F12. With this, the sheet S becomes flat along the supporting surface 171A between the guide members 172 and 173, and thus the rigidity of the sheet S is improved.

In the processing of step S111, the controller 27 causes the motors 22 and 23 so as to rotate the roll holder 143 and the driving rollers 161 and 181 normally, thereby conveying the sheet S successively to the downstream side of the conveying route 200 (namely, frontward). During this period, the controller 27 supplies a driving signal to the recording head 21 to thereby discharge or eject the ink to each of the labels 43 so as to record an image on each of the labels 43.

In a case that the recording of all the images is completed, then in the processing of step S112, the controller 27 stops the driving of the motor 22 and the driving of the motor 23, and also stops the driving of the pump 24 and the driving of the pump 25.

<Technical Effect of Printer 100>

According to the present embodiment, by driving the pump 24, the suction-attraction force is generated between the guide members 172 and 173 in the supporting surface 171A. The sheet S is along the supporting surface 171A by this suction-attraction force, and the rigidity of the sheet S in the width direction 9A thereof is increased. With this, even in a case that the ends in the width direction of the sheet S between the guide members 172 and 173 are brought into contact with the guide members 172 and 173 due to the moment, the sheet S is less likely to buckle by the contact force received by the sheet S from the guide members 172 and 173. Accordingly, any buckling of the sheet S in the sheet passing area which is adjacent to the guide members 172 and 173 arranged upstream of the front conveyor 18. Further, since the sheet S is less likely to buckle, any skewing of the sheet S is corrected.

In the present embodiment, the supporting surface 171A extends up to the location in front of the front ends of the guide members 172 and 173, and the groove part 171C is formed at the location in front of the guide members 172 and 173. Accordingly, the sheet S is attracted by suction to the supporting surface 171A also at the location, in the supporting surface 171A, which is in front of the front ends of the guide members 172 and 173. Accordingly, any skewing of the sheet S is less likely to occur in the supporting surface 171A at the location between the guide members 172 and 173 and the front conveyor 18.

Any rearward resistance is generated in the sheet S, which is (being) conveyed frontward by the rear conveyor 16 and/or the front conveyor 18, due to the rotation and/or the weight of the roll body. This resistance is not uniform but is distributed in the width direction 9A of the sheet S. Due to such a resistance, the skewing occurs in the sheet S in the conveying route 200. Further, in a case that the sheet S, which is a continuous sheet, once skews, the positions of the both ends of the sheet S at a specified position in the conveying route 200 is deviated leftward and rightward in an accumulated manner as the sheet S is being further conveyed. In the present embodiment, however, by generating the suction-attraction force between the guide members 172 and 173 in the supporting surface 171A, the generation of the skewing upstream of the front conveyor 18 is prevented, thereby making the skewing of the sheet S which is the continuous sheet to occur less likely.

In the present embodiment, since the sheet S is attracted by suction also to the supporting surface 2071A and 2071B, the skewing of the sheet S is prevented by the supporting surfaces 2071A and 2071B, thereby maintaining the positional relationship between the sheet S and the recording head 21.

The pump 24 is driven to thereby generate the air current from the both ends in the left-right direction 9 toward the through hole 171F in each of the grooves 171D. Owing to this air current, the suction-attraction force is generated in the sheet passing area in the supporting surface 171A. Accordingly, even in a case that the width of the sheet S is changed, it is possible to easily make the flow rate of the air in each of the grooves 171D to be unchanged. Namely, the suction-attraction force for attracting the sheet S by suction to the supporting surface 171A is less likely to vary. In particular, since each of the grooves 171D extends in the width direction 9A, the sheet S is supported stably.

In the guide members 172 and 173, the plurality of projected parts 172B are continuous with respect to the main body 172A, and the plurality of projected parts 173B are continuous with respect to the main body 173A, and each of the plurality of projected parts 172B and 173B is positioned in the inside of one of the grooves 171D. Therefore, there is not any gap between the supporting surface 171A and the main bodies 172A and 173A, and the sheet S is conveyed frontward without skewing.

Figure 7A:
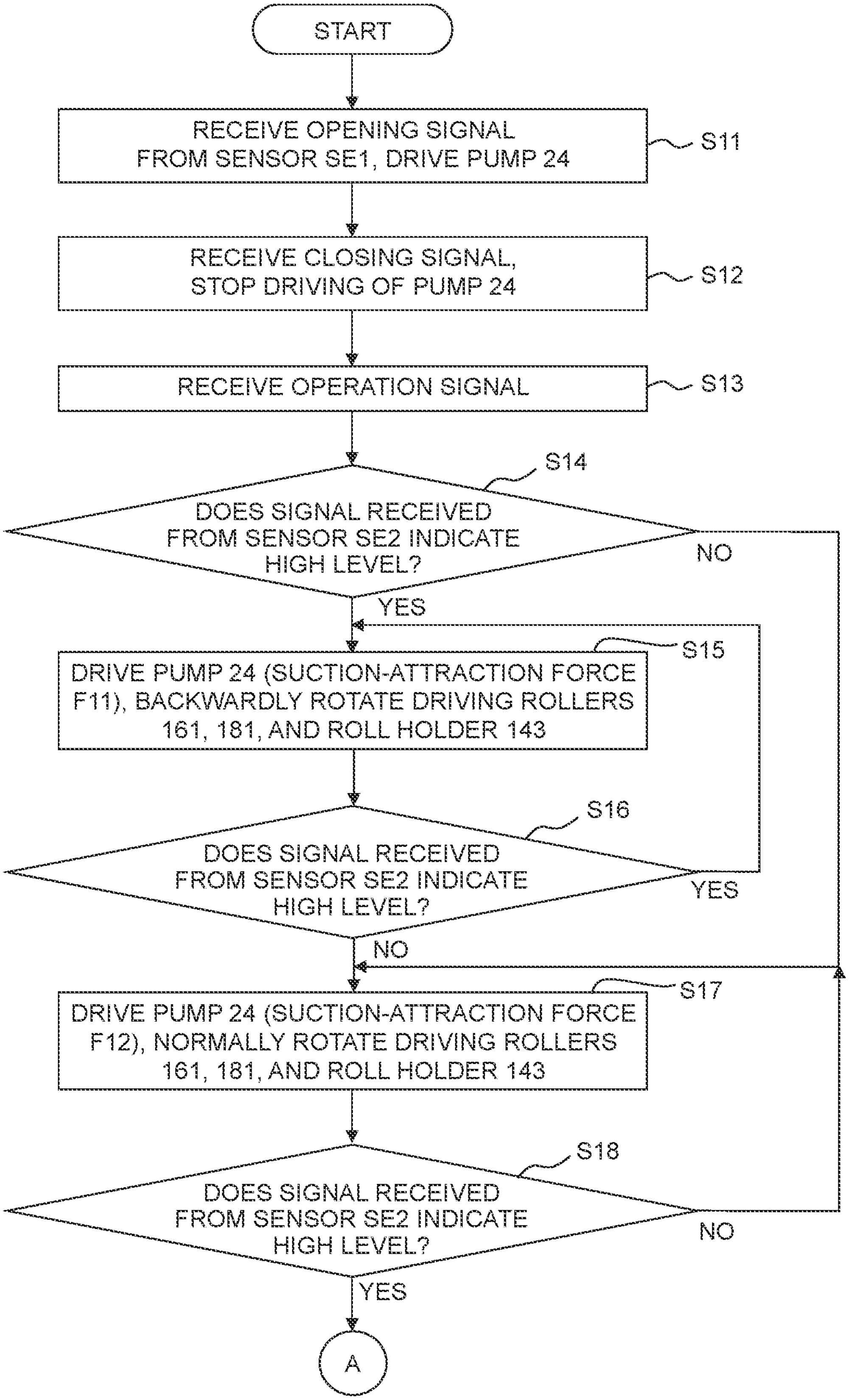
FIGS. 7A and 7B depict a flow chart indicating a processing procedure of a controller 27 of FIG. 3.
Figure 7B:
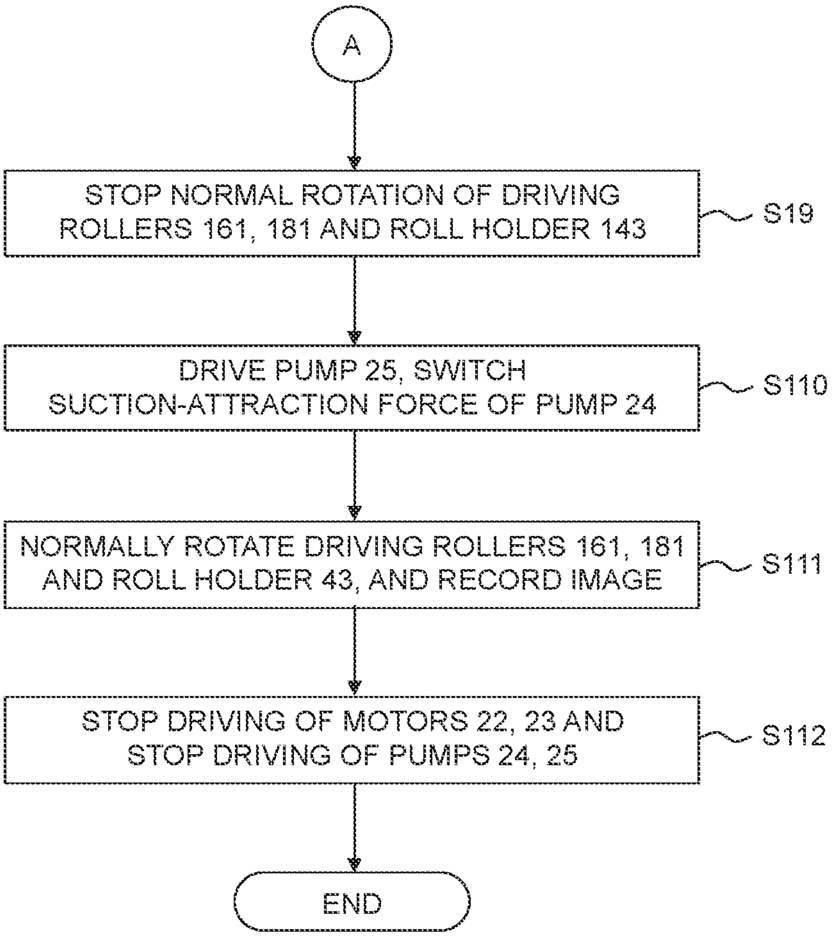

As appreciated from the processings of steps S11, S15, S17 and S110, respectively, of FIGS. 7A and 7B, since the pumps 24 and 25 are driven independently, the consumption of the electric force necessary for driving is suppressed.

According to the processing of step S11 of FIG. 7A, since the sheet S is set in the supporting surface 171A in the state that the suction-attraction force is generated, the sheet S can be easily positioned with respect to the supporting surface 17A by the guide members 172 and 173.

According to the processing of step S17 of FIG. 7A, in a case that the sheet S is conveyed frontward after the completion of setting of the sheet S to the supporting surface 171A, since the suction-attraction force F12 which is weaker than the suction-attraction forces F11 and F13 is generated in the supporting surface 171A, the forward end of the sheet S smoothly moves in a sliding manner on the supporting surface 171A; as a result, the forward end of the sheet S is hardly deformed.

<Other Modifications>

In the embodiment, the system of image recording is the ink-jet system. The present disclosure, however, is not limited to or restricted by this. The system of image recording may be an electrophotographic system, a thermal transfer system, etc.

Figure 1B:
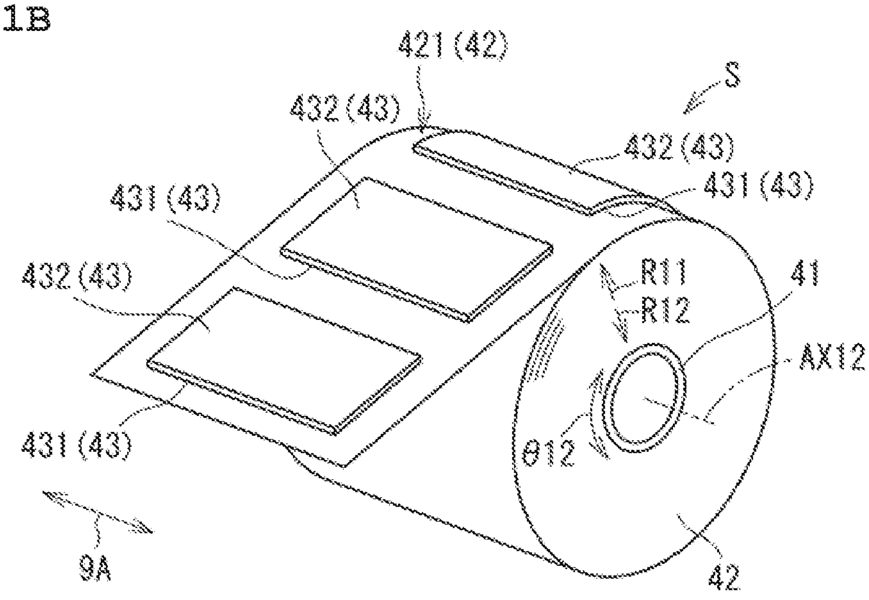
FIG. 1B is a perspective view depicting the outer appearance of a sheet (label rolled paper) S.

The sheet S of FIG. 1B has the sheet core 41. The present disclosure, however, is not limited to this, and it is allowable that the sheet S does not have the sheet core 41. In such a case, the separator 42 is wound in a roll shape such that a through hole having a cylindrical shape is defined in the central part of the separator 42 wound in the roll shape.

The sheet S of FIG. 1B is the label rolled paper. The present disclosure, however, is not limited to this, and it is allowable that the sheet S is rolled paper, namely continuous paper forming a roll body. In such a case, an image is recorded on the rolled paper itself.

The sheet S of FIG. 1B has the plurality of labels 43. The present disclosure, however, is not limited to this, and it is allowable that the sheet S has a separator, and a single label temporarily adhered to the separator. In such a case, the separator and the single label are made to be continuous paper forming a roll body, and an image is recorded on a main surface of the single label.

Other than those as described above, it is allowable that the sheet S is fan-folded paper, cut paper, etc. In a case that the sheet S is the fan-folded paper, the roll supporting part 14 is not required in the printer 100. In a case that the sheet S is the cut paper, the image recorded apparatus 100 is provided with a paper feed tray and a paper discharge tray, instead of the roll supporting part 14.

In the embodiment, the unit 17 lowers the pressure inside each of the grooves 171D by the air current to thereby attract the sheet S by suction to the supporting surface 171A. The present disclosure, however, is not limited to this, and it is allowable that the unit 17 sucks the sheet S from a suction hole(s) provided on a suction-attraction platen having a flat plate-like shape to thereby bring the sheet S into tight contact with a surface of the suction-attraction platen. Other than this, it is allowable that the unit 17 charges the supporting surface 171A so as to attract the sheet S to the supporting surface 171A by an electrostatic force. This point is also applicable similarly to the suction-attraction plate 207.

The printer 100 may have a platen which does not attract the sheet S thereto by suction, rather than the suction-attraction platen 207.

The endless belt 202 may be a so-called suction belt.

In the embodiment, each one of the flange parts 143B and 143C and the guide members 172 and 173 is slidably movable leftward and rightward, and position (align) the center in the width direction of the sheet S to the sheet passing center C11. The present disclosure, however, is not limited to this; in a case that the right cover 114 is provided on the right wall 111E, it is allowable that the flange part 143B and the guide member 172 are fixed, not being made to be slidably movable leftward and rightward, and that the flange part 143C and the guide member 173 are slidable movable leftward and rightward. In this case, each of the through holes 171F is formed in the vicinity of the fixed guide member 172. In a case that the guide member 172 is fixed, the printer 100 is provided with a roller group which brings the sheet S closely to and bring into contact with the guide member 172, instead of the guide member 173.

In the embodiment, each of the plurality of grooves 171D has a shape which is long in the left-right direction 9 (see FIGS. 5A and 5B). The present disclosure, however, is not limited to this, and it is allowable that each of the plurality of grooves 171D has a shape which is long in the front-rear direction 8. In such a case, since it is possible to make the plurality of grooves 171D to reach up to the front end of the supporting surface 171A, the sheet S further hardly skew between the guide members 172 and 173 and the front conveyor 18.

In the embodiment, the air current is generated in each of the plurality of grooves 171D by the pump 24. The present disclosure, however, is not limited to this, and it is allowable that the printer 100 generates the air current in each of the plurality of grooves 171D by a fan, instead of the pump 24.

In the processing of step S13 of FIG. 7A, the controller 27 executes the processing of step S14 and thereafter, in accordance with the reception of the operation signal in step S13. The present disclosure, however, is not limited to this, and it is allowable that the controller 27 executes the processing of step S14 and thereafter, in accordance with the reception of a print instruction from the information processing apparatus 300.

In the processing of step S11 of FIG. 7A, the controller 27 drives the pump 24 in accordance with the reception of the opening signal from the open/close sensor SE1. There is, however, such a case that the unit 17 is provided with a locking mechanism. The locking mechanism is configured to lock the left-right position of the guide members 172 and 173 and release the locking. The locking mechanism is configured to output a releasing signal to the controller 27, in accordance with the release of the locking. The releasing signal is another example of the signal indicating that the sheet S is to be set in the supporting surface 171A. It is allowable that the controller 27 drives the pump 24 in accordance with the reception of the releasing signal in the processing of step S11, determining that the sheet S is to be set to the supporting surface 171A.

In the embodiment, the open/close sensor SE11 outputs the signal to the controller 27, in accordance with the separation of the casing cover 112 from the close position P11. The present disclosure, however, is not limited to this, and it is allowable that the open/close sensor SE11 continues outputting of the signal during a period of time in which the casing cover 112 is located at the close position P11, and stops outputting of the signal during a period of time in which the casing cover 112 is not located at the close position P11. Other than this, it is allowable that the open/close sensor SE11 continues outputting of the signal during a period of time in which the casing cover 112 is not located at the close position P11, and stops outputting of the signal during a period of time in which the casing cover 112 is located at the close position P11.

What is claimed is:

1. A printer comprising:

a conveyor configured to convey a sheet in a conveying direction;

a first supporting part positioned upstream of the conveyor in the conveying direction, the first supporting part including a first supporting surface;

a side guide positioned on the first supporting surface and configured to make contact with at least one of both ends, in a width direction of the sheet, in the first supporting surface, the width direction being orthogonal to the conveying direction and parallel to the first supporting surface;

a suction-attraction force generator configured to generate a suction-attraction force in an area, in the first supporting surface, which is adjacent to the side guide and in which the sheet passes;

a second supporting part positioned downstream of the conveyor in the conveying direction, the second supporting part including a second supporting surface; and a head configured to record an image on the sheet supported by the second supporting surface.

2. The printer according to claim 1, wherein the first supporting surface extends to a position which is downstream of the side guide in the conveying direction and which is upstream of the conveyor in the conveying direction, and wherein the suction-attraction force generator is configured to generate the suction-attraction force in a part, in the first supporting surface, which is downstream of the side guide in the conveying direction.

3. The printer according to claim 1, wherein the sheet is rolled paper, and wherein the printer further comprises a roll supporting member configured to support the rolled paper, the rolled paper being rotatable about a central axis of the rolled paper.

4. The printer according to claim 1, further comprising a second suction-attraction force generator configured to generate a second suction-attraction force with which the sheet is attracted, by suction, to the second supporting surface.

5. The printer according to claim 4, further comprising a controller, wherein the controller is configured to execute:

driving of the suction-attraction force generator in accordance with reception of a signal indicating that the sheet is to be set in the first supporting surface; and driving of the second suction-attraction force generator in accordance with reception of a signal indicating start of image recording by the head.

6. The printer according to claim 1, wherein the first supporting part includes a groove recessed with respect to the first supporting surface, and wherein the suction-attraction force generator is configured to generate the suction-attraction force by generating an air current in the groove.

7. The printer according to claim 6, wherein the groove extends in the width direction.

8. The printer according to claim 6, wherein the side guide includes:

a main body configured to make contact with an end of the sheet on the first supporting surface; and a projected part which is connected to the main body and which is positioned inside the groove.

9. The printer according to claim 1, further comprising:

a casing on which an opening is formed, the first supporting part being accessible via the opening;

a casing cover configured to open and close the opening;

a sensor configured to output a signal in a case that the casing cover is opened; and a controller configured to execute driving of the suction-attraction force generator in response to receiving the signal from the sensor.

10. The printer according to claim 1, further comprising:

a second conveyor configured to convey the sheet in the conveying direction, the second conveyor being positioned upstream of the first supporting surface in the conveying direction;

a sensor configured to output a signal in accordance with presence or absence of the sheet at an initial position which is downstream of the conveyor in the conveying direction and which is upstream of the second supporting part in the conveying direction; and a controller configured to execute:

driving of the suction-attraction force generator, in response to receiving a signal indicating completion of setting of the sheet in the first supporting surface, so as to generate a third suction-attraction force which is weaker than the suction-attraction force and conveying of the sheet in the conveying direction by the second conveyor; and stopping of the sheet, conveyed by the second conveyor, at the initial position based on the signal outputted from the sensor.

11. The printer according to claim 1, wherein the side guide includes a first guide member and a second guide member which are configured to make contact, respectively, with the both ends in the width direction of the sheet, and which are capable of approaching closer to and separating away from each other in the width direction.

* * * * *